Oct. 19, 1965  F. W. GUTZWILLER  3,213,349
PROTECTIVE CONTROL CIRCUITS
Original Filed March 2, 1959

INVENTOR
FRANK W. GUTZWILLER
BY James R. Campbell
HIS ATTORNEY

United States Patent Office 3,213,349
Patented Oct. 19, 1965

3,213,349
PROTECTIVE CONTROL CIRCUITS
Frank W. Gutzwiller, Auburn, N.Y., assignor to General Electric Company, a corporation of New York
Continuation of application Ser. No. 796,567, Mar. 2, 1959. This application Apr. 18, 1962, Ser. No. 190,523
6 Claims. (Cl. 321—11)

This application is a continuation of application Serial No. 796,567, filed March 2, 1959 for Protective Control Circuits, now abandoned.

The invention described herein relates to protective control circuits and more particularly to an improved arrangement for protecting rectifiers and other voltage sensitive devices in power control and power switching applications against the adverse effects of sudden voltage surges of high magnitude.

Many different types of electrical apparatus and especially rotating equipment, utilize rectifiers in their control circuits for providing the unidirectional current flow necessary for operation. In some cases the equipment is subjected to or generates surge voltages of a magnitude far in excess of that capable of being handled safely by the control circuit components so that destruction of the rectifiers and/or damage to the electrical apparatus used in servicing a connected load may result. The problem of how to protect against such high induced voltages in the rectifier circuit in the event of transient conditions, such as a surge on the stator winding of a dynamoelectric machine, for example, which causes the field current to try to reverse, has not been solved to the satisfaction of engineers specializing in power control and power switching areas.

The transient voltage surges originate in many different sources, such as a sudden interruption in load current, or when the load is changed suddenly in one apparatus which concurrently is supplied from the same source as other apparatus controlled by the rectifier control circuits. Excessive regenerative voltages of the type developed where a motor performs a generator action when driven by an overhauling load, induces high voltage sources in the rectifier circuits, as well as lightning and other surges caused by switching operations as in the case of a transformer when switching occurs in the primary circuit. Protective devices corresponding to the amount of energy in the transients have been developed and applied in different circuit arrangements for dissipating the transient voltages and thereby preventing them from attaining destructive proportions.

Such protective devices have been used in the rectifier circuits with some degree of success but they do not permit the level of efficiency and performance deemed necessary for the proper operation of most apparatus. Linear resistors have been connected across the load and the output from the rectifier circuit but they must be of low ohmic value to maintain reasonable voltage levels and considerable energy is dissipated therein in the form of heat which accordingly lowers the efficiency. In some cases, as much current can be dissipated in the resistance as is used effectively in the power apparatus. Increased efficiency can be obtained by using higher voltage rectifiers and less power in the resistor but only at the expense of more costly parts. Also, voltage sensitive relays have been used to connect resistance into the circuit upon the occurrence of overvoltage but this means is relatively slow and subject to the shortcomings of mechanical devices. Capacitors with or without resistors, have been connected across the A.C. or D.C. line and have been used for high speed, low energy transients, but this arrangement will not limit the voltage unless the capacitor is of very large size which results in uneconomical costs. Possibly the most successful arrangement involves the use of voltage sensitive resistors where the high resistance dissipates about 0.1% of the total energy. In this device, the resistance decreases with increase in voltage to about the third power of the voltage. The disadvantage of this arrangement is that rectifiers are required with sufficient peak inverse voltage characteristics to handle voltages approximating several times that encountered when the circuit operates in a normal fashion.

In the case of transformer switching operations for example, where the transformer may be switched on and off, a ratio of at least 3 to 1 between the rated peak inverse voltage and operating peak inverse voltage is required. This high safety margin calls for rectifiers of unusually high peak inverse voltage for minimizing the possibility of damage to the rectifiers even in the case of low energy over voltage conditions. The switching transients are of relatively low energy levels but nevertheless are great enough to cause reverse failure of the rectifiers. Capacitive, linear and non-linear surge suppressors have been employed to reduce the voltage transients to safe operating values but the efficiency of the equipment is adversely affected. This and other voltage limiting devices have been used without completely satisfying all the requirements for simplicity, efficiency and economical operation.

An object of my invention therefore is to eliminate the disadvantages inherent in prior art arrangements for protecting control and rectifier circuits and control power equipment by providing an economical assemblage of semi-conductor devices capable of accurately controlling the level of surge transient voltages induced in the circuit.

In carrying out my invention I provide a circuit capable of protecting control components against sudden voltage surges induced in the circuit from a connected source or load. In a specific application, main circuit rectifiers interconnect each phase of an A.C. power source with a power using or power generating device for furnishing unidirectional current thereto. The main rectifiers are designed to supply normal operating voltage to the power devices and protection of the rectifiers against harmful line voltage surges induced in the main rectifier circuit by the devices, or from a remote source, is afforded by at least one controlled rectifier connected across the output terminals of the main rectifier circuit and the power devices. The firing voltage of the controlled rectifier is initiated by a zener diode, which has a breakdown voltage preferably at a value at or below the peak inverse voltage rating of the main rectifiers. The arrangement is such that when the line voltage resulting from a harmful voltage surge rises and reaches a predetermined value, the zener diode breaks down and causes the controlled rectifier to fire, thus drawing sufficient line current to drop the voltage to safe values. When the holding current in the controlled rectifier drops to a predetermined low amount, or when voltage is reversed across the terminals of the controlled rectifier by the action of the A.C. line, the controlled rectifier shuts off and reverts to a blocking state, thereby permitting the main rectifiers again to furnish the load with the desired level of voltage.

While the specification concludes with claims particularly pointing out and distinctly claiming the subject matter which I regard as my invention, it is believed the invention will be better understood from the following description taken in connection with the accompanying drawing in which:

Figure 1:
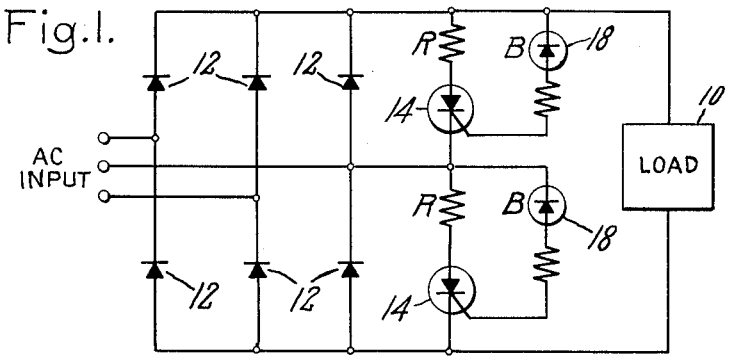
FIGURE 1 is a diagram illustrating a rectifier circuit used in providing D.C. voltage to a load and includes controlled rectifiers connected across the D.C. output for protecting the rectifier circuit against high voltage surges.

Referring to the drawings wherein like reference characters designate like or corresponding parts throughout the several views there is shown in FIGURE 1 a conventional bridge rectifier circuit connected to an alternating current source for supplying uni-directional current to a load 10. The rectifiers 12 are connected in each phase of the A.C. input and have their output terminals across the load. The load may comprise any kind of power using or power generating equipment, such as a motor or generator, transformer or the like, capable of inducing high voltage surges into the main rectifier circuit under certain conditions of operation. Such surges may originate in the load equiment as a result, for example, of sudden changes in motor field current in the case of D.C. motor armature loads, or when a D.C. motor is driven at higher than normal speed by an overhauling load or when it is used intentionally or accidentally for dynamic braking purposes. Voltage surges may also be induced in the load if it is the field of a synchronous motor during starting and synchronizing procedures. The load equipment may act as an agent for transferring surges not directly caused or generated in the load equipment, such as lightning surges. Voltage surges may also result from changes in load in other apparatus serviced by the same voltage source.

The number of points of origin of such surges are manifold and in order to dissipate and control their energy after introduction into the main rectifier circuit, a pair of switching type semiconductors 14 are connected across the output terminals of the main rectifier circuit and the load. The specific semiconductors used are silicon controlled rectifiers but it will be evident that any element capable of carrying out the same functions may be used with equal facility in the circuit. For convenience, the semiconductors are hereafter referred to as controlled rectifiers. Connection is also made between the controlled rectifiers 14 and at least one of the phases as indicated at 16. Zener diodes 18 are connected to respond to high voltage surges induced in the circuit from the load or from an external source for controlling the firing point of the silicon controlled rectifiers 14, thereby limiting the magnitude of voltage surges to safe values. By connecting the controlled rectifiers 14 between each of the D.C. buses and one of the A.C. leads, instead of directly across the D.C. bus, the controlled rectifier will be subjected to inverse voltage as soon as the D.C. bus voltage decreases to a value below the A.C. input. This allows the controlled rectifier to recover its blocking state and permits the gate to regain control of controlled rectifier conduction. No additional turn-off circuitry for the controlled rectifiers is required.

An ordinary semiconductor rectifier of the type indicated at 12 is formed in a wafer of P and N type semiconducting material. The semiconductor switch represented by the controlled rectifier 14 is similar to the ordinary rectifier except that it comprises a number of stacked layers or zones of P and N type semiconducting materials, e.g., PNPN. Four layers provide three contiguous junctions and a gate lead is attached to one of the center layers. When a positive voltage is applied to the outside P layer and negative voltage is applied to the outside N layer, the two outside junctions are biased in a forward direction while the inner junction is reversely biased. Current does not flow through the controlled rectifier under these conditions, except for small leakage current, but when the voltage is increased to the breakover voltage, the current gain of the device increases to unity, at which time, current therethrough will increase suddenly and become a function of the applied voltage and the load impedance. At this point, the controlled rectifier goes into a highly conductive state so long as the current through the device remains greater than a minimum value, normally called the holding current. When the current flow drops to a value less than the holding current, the controlled rectifier reverts to the forward blocking state.

The introduction of current through the gate lead also can be used for regulating firing of the controlled rectifier because it lowers the breakover voltage. In typical operation, the controlled rectifier is operated well below the forward breakover voltage and triggering is accomplished by injecting current into the gate lead. This permits use of a breakover voltage rating for the controlled rectifier much higher than that normally expected to be encountered in the circuit while also using only a moderate amount of trigger power to start the highly conductive mode of operation. As compared with a thyratron, the controlled rectifier is approximately 100 times faster and no filaments are required.

In operation, the main rectifiers 12 normally provide D.C. power to the load. When a voltage surge appears in the main rectifier circuit, it will have an energy value corresponding with the intensity of the surge and when the voltage reaches a value equal to the avalanche voltage of the zener diode, which is lower than the breakover voltage of the controlled rectifier, the diode conducts and supplies current to the bottom P-N junction of the controlled rectifier through the gate lead. The increase in current through the end junction causes an increase in current gain to occur and the controlled rectifier switches to its highly conductive state, passing current of a magnitude dependent on the voltage and impedance in the circuit. When the current from the surge drops to a value less than the holding current for which the particular controlled rectifier is designed, or when inverse voltage is applied to the controlled rectifier as a result of D.C. bus voltage decreasing to a value below the A.C. input, the controlled rectifier reverts to the forward blocking state where normal operation of the circuit can again occur. This simplified but efficient arrangement for controlling the surge voltage levels and thereby protecting control circuit components obviously can be applied to either delicate or rugged applications merely by selecting the correct size of parts. Additional control means for turning off the controlled rectifiers is not required. Conventional practices, such as providing resistors where needed for limiting current to the capabilities of the diodes and controlled rectifiers, should of course be resorted to.

Figure 2:
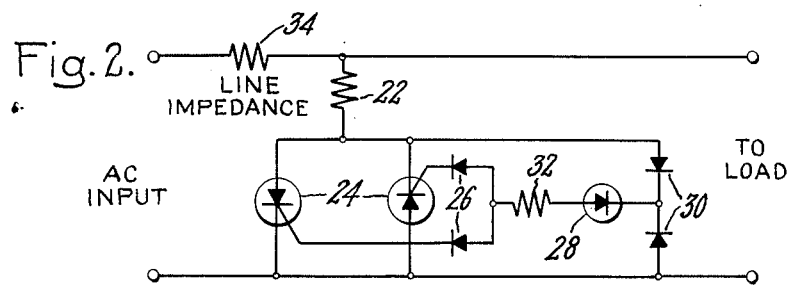
FIGURE 2 is a modification of the circuit illustrated in FIGURE 1 for protecting transistor and semiconductor rectifier circuits and other voltage sensitive elements against harmful line voltage surges by connecting controlled rectifiers across an A.C. line.

The modification shown in FIGURE 2 illustrates the type of circuit especially useful in eliminating harmful voltage surges from A.C. lines such as those feeding transistor and semi-conductor rectifier circuits. The silicon controlled rectifiers 24 are connected between the A.C. input and the load, and includes a resistor 22 placed in series with the pair of controlled rectifiers 24 each having a rectifier 26 connected to the gate lead. A zener diode 28 and rectifiers 30 supply current from the A.C. line to the gate junction of the controlled rectifiers so that when the line voltage exceeds a predetermined value, or when a voltage surge is induced in the circuit, the zener diode breaks down at a predetermined voltage level set at somewhat less than the peak inverse voltage and breakover voltage of the controlled rectifiers 24. Breakdown of the zener diode permits the application of a small current to the gates of the controlled rectifiers, thus causing the controlled rectifiers to switch into their highly conductive state. When this occurs, the voltage across the controlled rectifiers drops suddenly to a very low value and current of a magnitude dependent on the value of resistance 22 is then permitted to flow through the circuit. In order to protect the rectifiers 26 and gates from excessive current, a resistor 32 is inserted in series with the zener diode and rectifiers 26 and 30. When the controlled rectifiers fire, line current of sufficient value is drawn to drop the surge voltage across the line impedance, indicated at 34. The value of resistor 22 is selected to limit peak current through the controlled rectifiers to a value within their current rating. The voltage level at which suppression starts is determined by the breakdown voltage of the zener diode. Conduction of a controlled rectifier ceases at the end of its respective half cycle when the A.C. voltage reverses, thus permitting the gate of that rectifier to regain control of firing.

Figure 3:
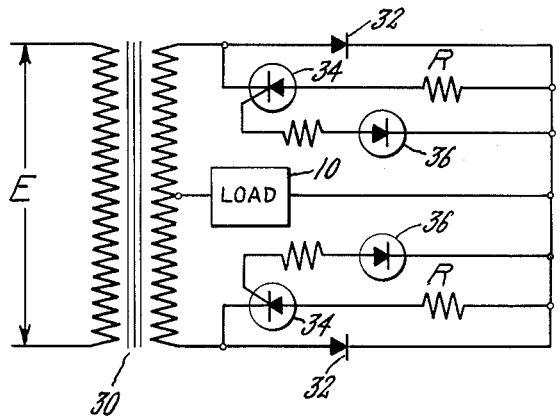
FIGURE 3 is still another modification illustrating an arrangement wherein the controlled rectifiers are connected across the power rectifiers.

The modification of FIGURE 3 illustrates another arrangement wherein a single phase center-tap transformer 30 is employed for providing A.C. voltage to the control circuit. Main power rectifiers 32 are connected to each side of the transformer secondary and the load 10 for supplying D.C. power to the load. The controlled rectifiers 34 are connected across the diode power rectifiers 32 and are controlled by zener diodes 36 which are sensitive to voltages slightly greater than the normal peak inverse voltage applied to the main power rectifiers 32. Resistors of the desired value may be used for protecting the circuit components from excessive current.

A voltage surge appearing in the line will cause breakdown of the zener diodes which causes the controlled rectifiers to fire and reduce the voltage in the circuit to safe values. The main rectifiers 32 will resume their function of supplying the load after current flow through the controlled rectifiers drops below the holding current value or when an inverse voltage is supplied to the controlled rectifier from the A.C. source.

In view of the above it will be evident that many variations and modifications are possible in light of the above teachings.

Zener diodes are preferred because of convenience and simplicity of operation. However, many different components may be used in lieu thereof. Gas tubes, spark gaps or simple resistances are examples. Also, simple R-C circuits designed to respond to rate of rise of voltage may be employed with success instead of the zener diodes. It therefore is apparent that any conventional control element similar to the above types which are capable of causing the controlled rectifiers to fire at the desired level may be used.

Obviously separate trigger circuits for each controlled rectifier of the type shown in FIGURE 2 for obtaining independent control of each polarity may be used. Likewise, use of only one controlled rectifier where transient voltage polarity is predetermined by the circuitry is possible. Many other different combinations and variations will be apparent to those skilled in the art who desire an arrangement of semiconductors for protecting control components against the adverse effects of harmful voltage surges. It therefore is to be understood that within the scope of the appended claims, the invention may be practiced otherwise than as specifically described.

What I claim as new and desire to secure by Letters Patent of the United States is:

1. An arrangement for protecting control elements in a system against harmful voltage surges comprising at least one control device adapted for connection to a source of voltage supply and having a load connected across its output terminals so that during operation of the system, first voltages having a predetermined maximum magnitude are supplied to the load, a non-gaseous semiconductor device connected across the control device terminals and the load, and responsive means in circuit with said semiconductor device and the load, said responsive means being sensitive to second voltages of a predetermined maximum and greater than said first voltages for causing the semiconductor device to conduct and limit the level of said second voltages to a predetermined value.

2. An arrangement for protecting control elements in an electrical system against harmful induced voltage surges comprising control means interconnecting a source of voltage supply and a connected load for supplying first voltages of predetermined maximum magnitude thereto, protective means between the control means and the load for protecting the former against harmful voltage surges, said protective means comprising a high speed semiconductor device having a peak inverse voltage rating slightly in excess of said voltages of maximum magnitude but less than that which otherwise would cause destruction of said control means, and a voltage responsive device connected with the load and said semiconductor device for biasing the latter to permit conduction when surge voltages of a value greater than said voltages of maximum magnitude are induced in the circuit.

3. An arrangement for protecting control elements in an electrical system against harmful induced voltage surges comprising control means interconnecting a source of voltage supply and a connected load for supplying first voltages of predetermined maximum thereto, at least one semiconductor device between the control means and the load for protecting the former against harmful voltage surges, said semiconductor device having a peak inverse voltage rating slightly in excess of said voltages of maximum magnitude but less than that which otherwise would cause destruction of said control means, a voltage responsive device having a breakover voltage less than the peak inverse voltage rating of the semiconductor device connected between the load and said device, so that when a voltage surge is induced in the circuit of a value greater than the voltage rating of the control means, the voltage responsive device biases said semiconductive device in a direction to permit it to pass current and thereby reduce the voltage level of the surge in the system.

4. An arrangement for protecting control elements in an electrical system against harmful induced voltage surges comprising a pair of rectifiers connected in each phase of an alternating current input and having their output terminals connected across a load for supplying first voltages thereto of a value sufficient to satisfy the load requirements, a pair of semiconductive devices connected across the output terminals of said rectifiers and said load for protecting said rectifiers against the harmful effects of surge voltages, said semiconductive devices capable of being biased to a value to cause conduction at a predetermined voltage level, and a biasing member connected to the load and said semiconductive devices and responsive to induced surge voltages of a value greater than said first voltages so that when a surge voltage appears in the system having a value greater than the first voltages, the biasing member breaks over and biases the semiconductor device to a conducting state, thereby to pass current and lower the voltage level of the surge.

5. An arrangement for protecting control elements in an electrical system against harmful voltage surges comprising a pair of rectifiers connected in each phase of an alternating current input and having their output terminals connected across a load for supplying unidirectional current thereto, a pair of semiconductor devices connected across said output terminals and the load, biasing members respectively interconnecting the semiconductive devices and the load and responsive to voltage levels in the system above the maximum voltage output of the rectifiers so that when said voltage level is reached as a result of a surge in the system, the biasing members cause the semiconductive devices to conduct, thereby inserting a load in the system for damping the surge voltages, and means connecting a common point of the semiconductive devices to the alternating current line to permit application of inverse voltage on the semiconductive devices when the surge voltage subsides to a lower value and thereby shut off conduction through the semiconductive devices and permit the rectifiers again to supply power to the load.

6. An arrangement for protecting control elements in an electrical system against the harmful effects of surge voltages comprising a transformer adapted for connection to an alternating current power source, a load connected to a center tap of the transformer secondary and rectifiers respectively connecting opposite ends of the secondary and the load, a pair of semiconductive devices in parallel relationship with the rectifiers and the load, and biasing means connected to the semiconductive devices and responsive to voltage levels above the peak inverse voltage rating of the rectifiers so that when a voltage surge appears in the circuit, the biasing means causes the semiconductor devices to fire and insert the load quickly in the circuit for reducing the voltage level of the surge and thereby permit the rectifiers to resume their function of supplying power to the load when inverse voltage from the A.C. source is applied to the semiconductive devices.

References Cited by the Examiner

UNITED STATES PATENTS 2,942,123   6/60   Schuh _____ 317—148.5
3,040,237   6/62   Jones _____ 317—33

LLOYD McCOLLUM, *Primary Examiner.*